Nov. 9, 1926.
J. F. CAVANAGH
BRAKE MECHANISM
Filed June 18, 1926
1,606,144
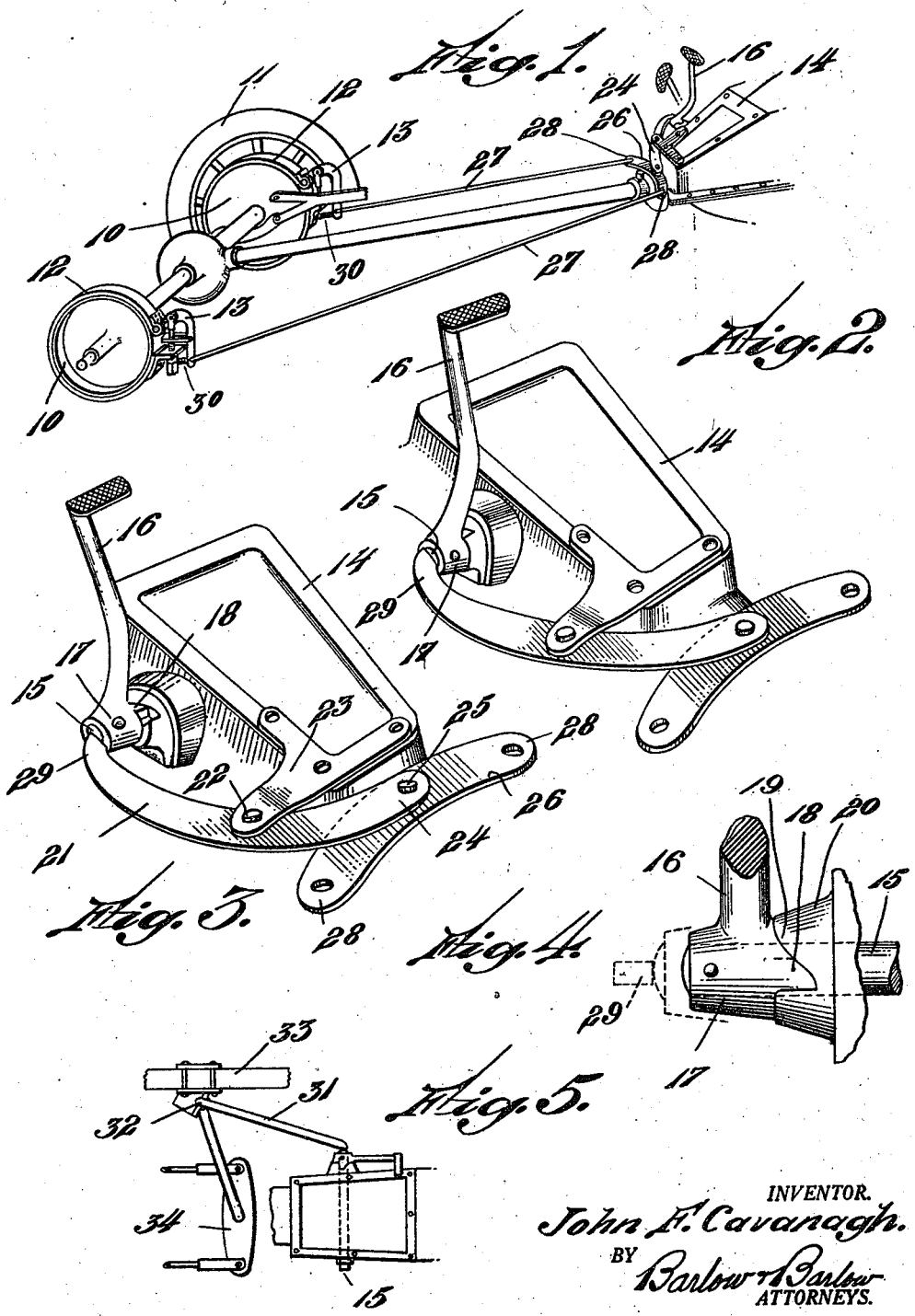
INVENTOR.
John F. Cavanagh.
BY Barlow & Barlow
ATTORNEYS.

Patented Nov. 9, 1926.

1,606,144

UNITED STATES PATENT OFFICE.

JOHN F. CAVANAGH, OF PROVIDENCE, RHODE ISLAND, ASSIGNOR TO APCO MANUFACTURING COMPANY, OF PROVIDENCE, RHODE ISLAND, A CORPORATION OF RHODE ISLAND.

BRAKE MECHANISM.

Application filed June 18, 1926. Serial No. 116,877.

This invention relates to an improved construction of brake-operating mechanism for motor vehicles; and has for its object to provide in a vehicle having brake bands on its wheel an endways movable shaft disposed transversely of the vehicle and a foot lever for operating said shaft, to set said brake bands.

A further object of this invention is the provision of a lever pivoted intermediate its ends adjacent the transmission gear casing of the vehicle, one end of the lever being operatively connected to the brake bands and the other being operated by engagement with the endways movable shaft, which shaft is actuated by a foot lever controlled by the operator of the vehicle for setting the brakes.

With these and other objects in view, the invention consists of certain novel features of construction, as will be more fully described, and particularly pointed out in the appended claims.

In the accompanying drawings:

Figure 1 is a perspective view illustrating my improved brake-operating mechanisms.

Figure 2 is a perspective view illustrating the foot brake operating mechanism in inoperative position.

Figure 3 shows the foot brake lever as having been moved forward and the mechanism in operative position.

Figure 4 is a detailed view illustrating the cooperating cam members on the endways movable shaft mounted on the transmission gear casing also a portion of the foot lever by which the shaft is rotated and the cam which is caused to impart an endway movement to the shaft by action of the foot lever, the dotted lines showing the endway extended position of the shaft.

Figure 5 is a modification showing the operating lever being pivoted on the frame instead of on the gear casing.

Some certain types of motor vehicles are provided with a brake band inside of the gear casing which is operated by an endways movable shaft actuated by the foot lever and in some cases particularly where the vehicle is called upon to perform the heavier class of work this form of brake is found inadequate and therefore brake bands are applied to drums on the wheels and in order to operate these wheel brakes my present invention provides a simple and effective mechanism for utilizing the endways movement of this said shaft to actuate the brakes to grip the brake drums and to this end I have provided a lever which is pivoted intermediate its ends, one end being connected through suitable connecting means to the brake drums on the vehicle wheels while the other end is engaged and operated by the endways movement of this shaft, which endways movement is imparted to the shaft, by the action of the foot lever to rotate the shaft which is simultaneously moved endways by action of a cam upon it; and the following is a detailed description of the present embodiment of my invention and showing one means by which the brakes may be operated and these advantageous results thus obtained:—

With reference to the drawings, 10 designates the brake drums on the usual vehicle wheels 11 on the outside of which are herein shown brake bands 12 which may be set up to grip the drums by the usual levers 13.

Forward of the rear wheels of the vehicle is the usual transmission gear casing 14 in which is mounted a transversely disposed endways movable shaft 15. On this shaft is mounted the usual brake operating foot lever 16. The inner face of the hub portion 17 of this lever being formed in cam-shape as at 18 to cooperate with the outer cam-shaped face 19 of the casing hub 20, whereby a forward movement of the foot lever 16 imparts a rotative movement to the shaft and at the same time causes the cam faces 18 and 19 to cooperate and ride one upon the other and simultaneously impart an endways movement to this shaft.

This invention refers more particularly to the utilizing of the endways movement of this shaft to impart a powerful gripping movement to the brake bands on the wheels and to this end I have provided a lever 21 which in some cases, is pivoted intermediate its ends at 22 on the bracket 23 supported on the gear casing. One end 24 of this lever is pivotally connected at 25 to the equalizing arm 26, which arm is connected at its opposite ends 28 by rods or wires 27 to the aforesaid brake band levers 13 and the opposite or free end 29 of this lever 21 is caused to engage the end of the shaft 15 whereby when the foot lever 16 is pressed forwardly the shaft 15 through its cam is caused to rotate and at the same time move endways outwardly and swing the lever 21 on its pivot 22 to pull forwardly on the levers 13 through the connections 27 to cause the brake bands 12 to grip the drums, the usual springs 30 being provided for moving the brake-setting mechanism to released position when the foot lever 16 is released and permitted to return to its normal position.

In some instances, where a still heavier type of brake device is required, I may pivot the lever 31 at the point 32 on the frame 33 instead of on the gear casing, as best illustrated in Figure 5, the endways movement of the shaft 15 acting upon this lever the same as above described to pull forward the equalizing bar 34 to set up the brake bands 12.

My improved brake operating mechanism is very strong and durable and by its cam action exerts a very powerful action to operate the brakes and arrest the movement of the car even when heavy loads are being carried thereby.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a brake operating mechanism for motor vehicles having brake bands on its wheels, in combination with a laterally disposed endways movable shaft, a foot lever for actuating said shaft and means whereby the endways movement of the shaft is caused to operate said brake bands.

2. In a motor vehicle having brake drums on its wheels, brake bands operatively mounted to engage said drums, an endways movable shaft disposed transversely of the vehicle, and means engaging said shaft to transmit motion therefrom to operate said brake bands.

3. In a brake operating mechanism for motor vehicles, in combination with brake bands on the vehicle wheels, of a cam, a foot lever for actuating said cam, a lever operated by action of said cam to set said brake bands.

4. In a brake operating mechanism for motor vehicles having a transmission gear case, in combination with brake bands on the vehicle wheels, of a lever pivotally supported adjacent the gear case and operatively connected to said brake bands, and a foot lever operated cam for acting on said pivoted lever to operate said brakes.

5. In a brake operating mechanism for motor vehicles having a transmission gear case in combination with brake bands on the vehicles wheels, of a lever pivotally supported adjacent the gear case and operatively connected to said brake bands, a laterally movable shaft supported on said gear case, a cam, and a foot lever for rotating said shaft and causing said cam to impart an endways movement to said shaft to rock said lever to set said brakes.

6. In a motor vehicle having an endways movable shaft, a foot pedal having a cam surface for rotating said shaft to move it endways and a pair of brake drums on the rear wheels, in combination with a support fixed relative to said shaft, a lever pivoted intermediate its ends on said support positioned to have one end engage said shaft to be swung on its pivot by an endways movement thereof and means for transmitting the movement of the opposite end of said lever to cause said brake bands to grip said drum.

7. In a brake operating mechanism for motor vehicles having a transmission gear casing, in combination with an endways movable shaft supported in said casing, brake bands on the vehicle wheels, of a pivot bracket mounted adjacent the gear case, a lever pivoted intermediate its ends in said bracket, one end of said lever being operatively connected to said brakes and its other end being positioned to be operated by the endways movement of said shaft, and a foot lever and cam for imparting an endways movement to said shaft.

It testimony whereof I affix my signature

JOHN F. CAVANAGH.